(12) United States Patent
Creech et al.

(10) Patent No.: US 11,953,348 B2
(45) Date of Patent: Apr. 9, 2024

(54) NON-CONTACT SENSOR ASSEMBLY AND METHOD OF SENSING USING THE SAME

(71) Applicant: Dana Automotive Systems Group, LLC, Maumee, OH (US)

(72) Inventors: Michael Z. Creech, Ann Arbor, MI (US); Perry M. Paielli, Sand Creek, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 707 days.

(21) Appl. No.: 16/846,558

(22) Filed: Apr. 13, 2020

(65) Prior Publication Data

US 2020/0326210 A1 Oct. 15, 2020

Related U.S. Application Data (60) Provisional application No. 62/833,406, filed on Apr. 12, 2019.

(51) Int. Cl.
| | | |
|---|---|---|
| *G01D 5/20* | (2006.01) | |
| *B60B 35/12* | (2006.01) | |
| *B60K 1/00* | (2006.01) | |
| *G01D 5/244* | (2006.01) | |

(52) U.S. Cl.
CPC ......... *G01D 5/2066* (2013.01); *B60B 35/122* (2013.01); *G01D 5/244* (2013.01)

(58) Field of Classification Search
CPC ...... B60B 35/122; B60K 17/165; B60K 1/00; B60Y 2400/30; G01D 5/2066; G01D 5/244; G01P 3/44; G01P 3/488
See application file for complete search history.

(56) References Cited

U.S. PATENT DOCUMENTS

| | | | |
|---|---|---|---|
| 4,697,460 A | | 10/1987 | Sugiyama |
| 4,893,075 A | * | 1/1990 | Dierker, Jr. ............. G01P 3/488 |
| | | | 324/225 |
| 4,939,937 A | | 7/1990 | Klauber |
| 6,494,102 B2 | | 12/2002 | Hanisko |
| 8,482,434 B2 | | 7/2013 | Bajekal |
| 10,107,132 B2 | | 10/2018 | Wu |
| 2004/0132572 A1 | * | 7/2004 | Ludwig ................. F16H 48/295 |
| | | | 475/150 |
| 2007/0142157 A1 | * | 6/2007 | Nofzinger ............... F16H 48/16 |
| | | | 475/231 |
| 2008/0252336 A1 | | 10/2008 | Krumme |
| 2009/0013773 A1 | * | 1/2009 | Acker ..................... B60T 8/171 |
| | | | 73/146.2 |

(Continued)

FOREIGN PATENT DOCUMENTS

CN 110350668 10/2019

*Primary Examiner* — Son T Le
*Assistant Examiner* — Adam S Clarke
(74) *Attorney, Agent, or Firm* — McCoy Russell LLP (57) ABSTRACT

A network including a sensory assembly having a first wire coil coupled to a stationary component, and a spaced apart second wire coil coupled to a movable component. An interstice is formed between the wire coils. The stationary first wire coil is employed in a primary electrical circuit and the movable second wire coil is employed in a second electrical circuit. A magnet flux field permits at least a portion of an electrical current varied as a function of a parameter of the movable component to be transmitted between the electrical circuits.

19 Claims, 5 Drawing Sheets

(56) References Cited

U.S. PATENT DOCUMENTS

| | | | |
|---|---|---|---|
| 2010/0272380 A1* | 10/2010 | Zink | G01P 3/488 |
| | | | 73/494 |
| 2015/0028859 A1* | 1/2015 | May | G01B 7/14 |
| | | | 324/207.15 |
| 2015/0038277 A1* | 2/2015 | Tamura | B60L 15/2054 |
| | | | 475/150 |
| 2016/0356866 A1 | 12/2016 | Attridge | |
| 2016/0363204 A1* | 12/2016 | Paielli | F16H 48/34 |
| 2018/0292235 A1 | 10/2018 | Filatov | |
| 2020/0057089 A1 | 2/2020 | Yang | |

\* cited by examiner

OUTPUT SIGNAL-ONE PEAK PER REVOLUTION.
MAGNATUDE OF EACH PEAK IS THE VALUE OF SIGNAL

FIG. 10

NON-CONTACT SENSOR ASSEMBLY AND METHOD OF SENSING USING THE SAME

RELATED APPLICATION

This U.S. non-provisional patent application claims priority to and the benefit of U.S. Provisional Patent Application Ser. No. 62/833,406 filed on Apr. 12, 2019, which is incorporated herein by reference in its entirety.

FIELD

The presently disclosed subject matter relates to a sensor assembly, and more particularly to a non-contact sensor assembly and method of sensing using the same in a vehicle.

BACKGROUND

For machines that contain rotating components it is often required to know a state of such rotating components. A vehicle includes numerous rotating components such as a rotor of an electric motor and a differential case and gear of a differential assembly, for example. It is known to determine the state of the rotating components using various parameters associated with the rotating components including, but not limited to, torque measurements, temperature, and speed. One conventional method of obtaining measurement signals from the rotating components employs brushes. However, this method is subject to wear and generates undesirable noise since the brushes directly contact the rotating component during a rotational movement thereof.

It would be desirable to produce a non-contact sensor assembly and method of sensing using the same, in which durability, accuracy, and applicability are maximized.

SUMMARY

In concordance and agreement with the present disclosure, a non-contact sensor assembly and method of sensing using the same, in which durability, accuracy, and applicability are maximized, has surprisingly been discovered.

A non-contact sensor assembly and method of sensing using the same of the presently disclosed subject matter provides sensor information via a magnetic field located between a movable component and a stationary component of a machine. An alternating current (AC) signal is conducted over an interstice between a stationary wire coil of a primary electrical circuit and a movable wire coil of a secondary electrical circuit. As such, direct signal conductors are not needed. The wire coils are wound about respective mounting structures to form a transformer with the interstice between the wire coils. An electrical current provided by an AC voltage source is measured at the primary electrical circuit to determine an electrical load of the secondary electrical circuit. The electrical load of the secondary electric circuit is a function of a sensor signal.

In one embodiment, an axle assembly, comprises: a housing; a movable component at least partially disposed in the housing; and a sensor assembly configured to sense a parameter of the movable component of the axle assembly, the sensor assembly including: a stationary first wire coil disposed within the housing, the first wire coil in electrical communication with a first electrical circuit; and a second wire coil disposed within the housing and coupled to the movable component for rotation therewith, the second wire coil in electrical communication with a second electrical circuit including a sensing device for measuring the parameter of the movable component of the axle assembly, wherein the second wire coil is disposed adjacent the first wire coil generating a magnetic field therebetween, and wherein the magnetic field facilitates transmission of an electrical current varied as a function of the parameter of the movable component of the axle assembly from the second electrical circuit to the first electrical circuit.

As aspects of certain embodiments, the stationary wire coil is coupled to one of the housing of the axle assembly, an actuating mechanism of a differential assembly of the axle assembly, and a stator of an electric motor of the axle assembly.

As aspects of certain embodiments, the movable component is one of a differential case of a differential assembly of the axle assembly and a rotor of an electric motor of the axle assembly.

As aspects of certain embodiments, the second wire coil is radially spaced apart from the first wire coil.

As aspects of certain embodiments, the second wire coil is axially spaced apart from the first wire coil.

As aspects of certain embodiments, at least one of the first and second wire coils is one of a continuous ring-shaped coil, a single coil element, and an array of coil elements disposed in a ring-shaped configuration.

As aspects of certain embodiments, the first electrical circuit includes a signal device for generating an output signal indicative of the parameter of the movable component.

As aspects of certain embodiments, the first electrical circuit includes a signal conditioning circuit for generating an output signal indicative of the parameter of the movable component.

As aspects of certain embodiments, the second electrical circuit further includes a capacitor connected in parallel with the sensing device.

As aspects of certain embodiments, the second electrical circuit further includes an amplifier for increasing a magnitude of a sensor signal generated by the sensing device.

As aspects of certain embodiments, the amplifier is in electrical communication with a resistor configured to receive the electrical current varied as a function of the parameter of the movable component.

As aspects of certain embodiments, the second electrical circuit further includes a conditioning circuit for receiving and conditioning a sensor signal generated by the sensing device.

As aspects of certain embodiments, the conditioning circuit includes a resistor configured to receive the electrical current varied as a function of the parameter of the movable component.

In another embodiment, a method of sensing, comprises the steps of: providing an axle assembly including a sensor assembly configured to sense a parameter of a movable component of the axle assembly, wherein the sensor assembly includes a first wire coil and a spaced apart second wire coil, wherein the first wire coil is in electrical communication with a first electrical circuit including a signal device, and wherein the second wire coil is in electrical communication with a second electrical circuit including a sensing device for measuring the parameter of the movable component; generating a magnetic field between the first wire coil and the spaced apart second wire coil; transmitting an electrical current from the first electrical circuit to the second electrical circuit using the magnetic field; measuring the parameter of the movable component utilizing the sensing device of the second electrical circuit; transmitting an electrical current varied as a function of the parameter of the movable component from the second electrical circuit to the first electrical circuit using the magnetic field; and generating an output signal indicative of the parameter of the movable component using the signal device of the first electrical circuit.

As aspects of certain embodiments, the sensing device generates a sensor signal used to vary the electrical current transmitted from the first electrical circuit to the second electrical circuit.

As aspects of certain embodiments, further comprising the step of amplifying a magnitude of the sensor signal generated by the sensing device.

As aspects of certain embodiments, further comprising the step of conditioning at least one of the electrical current transmitted from the first electrical circuit to the second electrical circuit and the sensor signal generated by the sensing device.

As aspects of certain embodiments, further comprising the step of conditioning the output signal generated by the signal device.

As aspects of certain embodiments, further comprising the step of transmitting the output signal generated by the signal device to a controller configured to process the output signal for improving an operation of the axle assembly.

In yet another embodiment, a network, comprises: a first electrical circuit including a power source and a signal device, wherein the signal device generates an output signal indicative of a parameter of a movable component; a second electrical circuit including a sensing device, wherein the sensing devices measures the parameter of the movable component and generates a corresponding sensor signal; and a sensor assembly, including: a first wire coil in electrical communication with the first electrical circuit; and a second wire coil in electrical communication with the second electrical circuit, wherein the second wire coil is spaced apart from the first wire coil generating a magnetic field therebetween to facilitate a transmission of an electrical current varied as a function of the parameter of the movable component from the second electrical circuit to the first electrical circuit; wherein the second electrical circuit further includes at least one of an amplifier for increasing a magnitude of the sensor signal generated by the sensing device and a conditioning circuit for receiving and conditioning the sensor signal generated by the sensing device, and wherein the sensor signal is used to vary the electrical current transmitted from the first electrical circuit to the second electrical circuit.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

It is to be understood that the presently disclosed subject matter may assume various alternative orientations and step sequences, except where expressly specified to the contrary. It is also to be understood that the specific apparatuses, systems, and methods illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
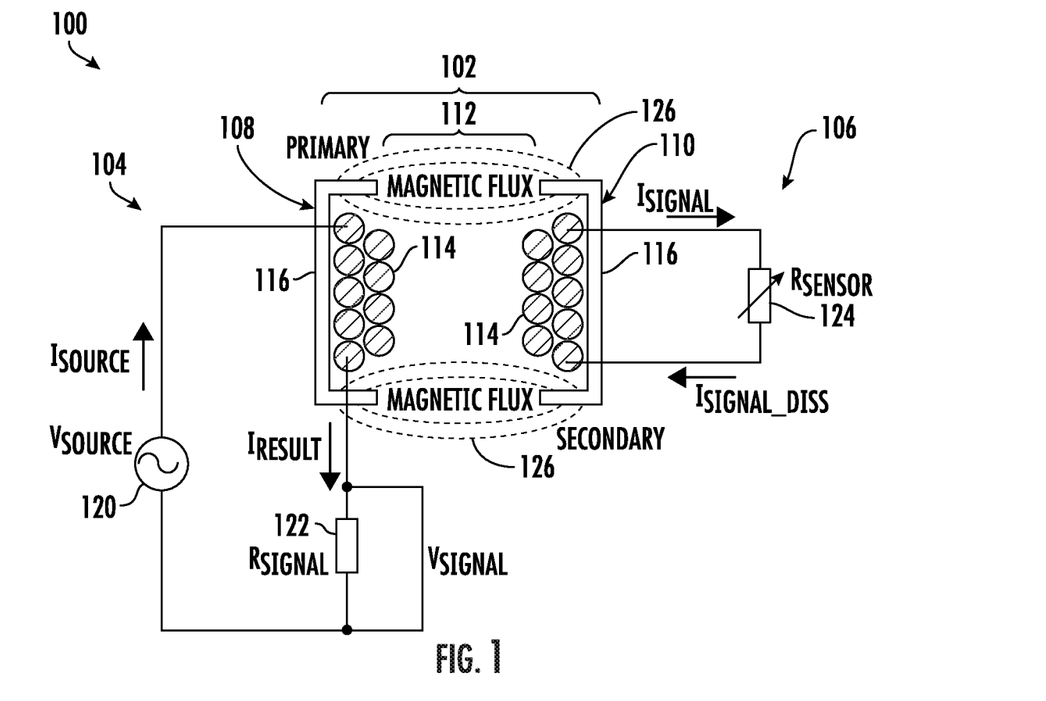
FIG. 1 is a schematic diagram of a network including a sensor assembly in electrical communication with a primary electrical circuit and a secondary electrical circuit according to an embodiment of the presently disclosed subject matter.

FIG. 1 illustrates a network 100 according to an embodiment of the presently disclosed subject matter. The network 100 includes a sensor assembly 102 in electrical communication with a primary or first electrical circuit 104 and a secondary or second electrical circuit 106. As illustrated, the sensor assembly 102 includes a stationary or first wire coil 108 and a spaced apart movable second wire coil 110 forming an interstice 112 (i.e. an air gap) therebetween. In certain embodiments, the stationary wire coil 108 is coupled to a stationary component (not depicted) of a machine (not depicted) and the movable wire coil 110 is coupled to a movable component (not depicted) of the machine. The movable wire coil 110 shown is configured to rotate about a rotational axis X, shown in FIG. 2, which passes through a center point thereof. It is understood, however, that the movable wire coil 110 may be configured to move about or along any suitable axis as desired.

Figure 2:
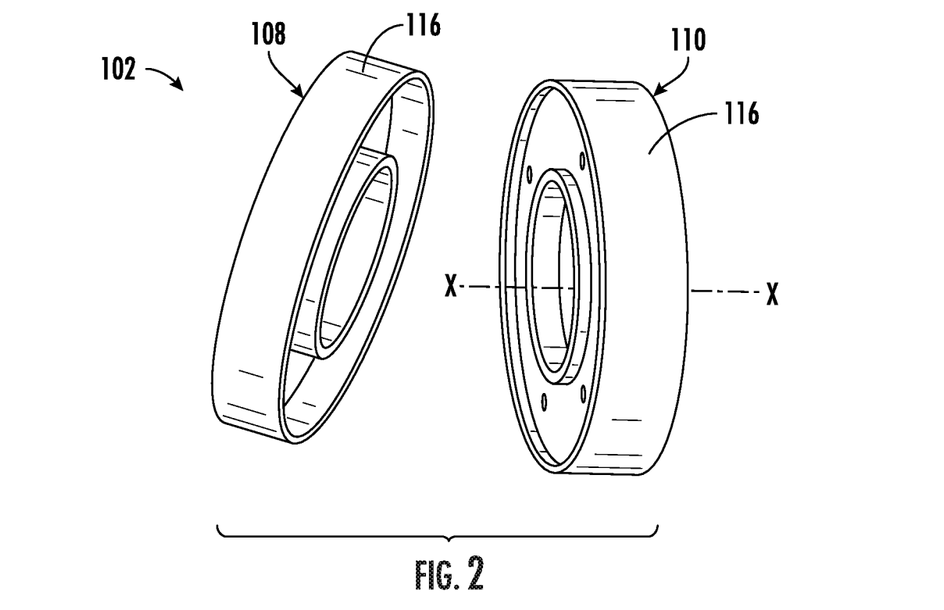
FIG. 2 is a perspective view of a portion of a sensor assembly including a stationary wire coil and a movable wire coil, which may be utilized in the network shown in FIG. 1.

Each of the wire coils 108, 110 shown may be formed by an electrical wire 114 wrapped about a mounting structure 116. As illustrated in FIG. 2, the mounting structure 116 may be a C-shaped housing configured to receive the electrical wire 114 therein. It should be appreciated that any suitable method may be used to form the wire coils 108, 110. Although both of the wire coils 108, 110 may have the same general size, shape, and configuration as shown in FIG. 2, it is understood that each the wire coils 108, 110 may have any suitable size, shape, and configuration as desired. For example, an inner diameter of one of the wire coils 108, 110 may be larger than an outer diameter of a remaining one of the wire coils 108, 110 to allow the one of the wire coils 108,110 to be concentrically disposed about the remaining one of the wire coils 108, 110.

Referring now to FIG. 1, the stationary wire coil 108 is employed in the primary electrical circuit 104. The primary electrical circuit 104 may further include a power source 120 or $V_{source}$ (e.g. an oscillator) and a signal device 122 configured to generate an output signal. In certain embodiments, the signal device 122 may be a resistor or $R_{signal}$ with an associated $V_{signal}$ indicative of a sensed parameter of the movable component. In other embodiments, however, the signal device 122 may be other types of electrical current sensing devices (e.g. a hall-effect sensor) and methods that are configured to convert an electrical current (e.g. $I_{result}$) into a measurable output signal indicative of the sensed parameter of the movable component. The signal device 122 may also be in electrical communication with a controller (not depicted) configured to receive and process the output signal.

The power source 120 is configured to supply an electrical current $I_{source}$ to the stationary wire coil 108 of primary electrical circuit 104. The movable wire coil 110 is employed in the secondary electrical circuit 106 to facilitate transmission of an electrical current $I_{signal}$ from the primary electrical circuit 104 to the secondary electrical circuit 106. In certain embodiments, the electrical current $I_{signal}$ is a portion of the electrical current $I_{source}$ supplied by the power source 120. Each of the electrical currents $I_{source}$ and $I_{signal}$ is an alternating current (AC). It should be appreciated, however, that the electrical currents $I_{source}$ and $I_{signal}$ may be any suitable electrical current, if desired. As illustrated in FIG. 1, the secondary electrical circuit 106 may further include a sensing device 124 such as a resistor or $R_{sensor}$. The sensing device 124 is configured to sense and/or measure a parameter of the movable component and generate a corresponding sensor signal. It should be appreciated that the sensing device 124 of the secondary electrical circuit 106 may be other suitable types of sensors which are configured to sense and/or measure a parameter of the movable component such as sensors that change an electrical current as a function of an operational parameter, for example.

During operation of the network 100, the power source 120 supplies the electrical current $I_{source}$ to the primary electrical circuit 104. As illustrated, the electrical current $I_{source}$ flows from the power source 120 through the stationary wire coil 108. A magnet flux field 126 may be produced as the electrical current $I_{source}$ flows through the stationary wire coil 108. In certain embodiments, the magnet flux field 126 facilitates a transmission of a portion of the electrical current $I_{source}$ from the primary electrical circuit 104 across the interstice 112 to the movable wire coil 110 of the secondary electrical circuit 106, resulting in the electrical current $I_{signal}$. More specifically, the stationary wire coil 108 may convert the electrical current $I_{source}$ from an electrical signal to a magnetic signal by modulating the magnetic flux field 126, and the movable wire coil 110 converts the magnetic signal received from the stationary wire coil 108 to the electrical current $I_{signal}$. A remaining portion of the electrical current $I_{source}$ continues to flow through the stationary wire coil 108 of the primary electrical circuit 104.

Simultaneously, the electrical current $I_{signal}$ flows from the movable wire coil 110 through the sensing device 124 and returns to the movable wire coil 110. As the electrical current $I_{signal}$ flows through the sensing device 124, the sensing device 124 senses and/or measures the parameter of the movable component and generates the corresponding sensor signal. In the embodiment shown, the sensor signal is an amount of energy of the electrical current $I_{signal}$ that flows through the sensing device 124 which is dissipated, generating an electrical current $I_{signal\_diss}$. The electrical current $I_{signal\_diss}$ then flows from the sensing device 124 and returns to the movable wire coil 110. In certain embodiments, the magnet flux field 126 also facilitates a transmission of the electrical current $I_{signal\_diss}$ from the sensing device 124 to the movable wire coil 110, across the interstice 112, to the stationary wire coil 108 of the primary electrical circuit 104. More specifically, the movable wire coil 110 may convert the electrical current $I_{signal\_diss}$ from an electrical signal to a magnetic signal by modulating the magnetic flux field 126, and the stationary wire coil 108 converts the magnetic signal received from the movable wire coil 110 to the electrical current $I_{signal\_diss}$. In certain embodiments, the remaining portion of the electrical current $I_{source}$ flowing from the power source 120 through the stationary wire coil 108 may be summed with the electrical current $I_{signal\_diss}$ transmitted from the secondary electrical circuit 106, resulting in an electrical current $I_{result}$.

Thereafter, the electrical current $I_{result}$ flows from the stationary wire coil 108 through the signal device 122 to return to the power source 120. The signal device 122 generates an output signal indicative of the sensed parameter of the movable component. In certain embodiments, the electrical current $I_{result}$ may have a dissipated amount of energy which is reflected in an amount of voltage $V_{signal}$ that is developed across the signal device 122. Such variation in the amount of energy of the electrical current $I_{source}$ to the amount of energy of the electrical current $I_{result}$ is indicative of the sensed parameter of the movable component of the machine. The output signal (e.g. $V_{signal}$) is then received and processed by the controller, and can be used to enhance operation and performance of the machine.

In one non-limiting example, the sensing device 124 may be a thermistor coupled to the movable component. Hence, the output signal generated by the signal device 122, which is representative of the variation in the amount of energy of the electrical current $I_{source}$ to the amount of energy of the electrical current $I_{result}$, is indicative of a temperature of the thermistor coupled to the movable component. Accordingly, the temperature of the movable component may be determined without direct contact by a measurement device such as brushes, for example.

In another non-limiting example, the sensing device 124 may be coupled to the movable component. Hence, the output signal generated by the signal device 122, which is representative of the variation in the amount of energy of the electrical current $I_{source}$ to the amount of energy of the electrical current $I_{result}$, is indicative of a sensed parameter (e.g. a position, a rotational speed, a torque, and the like) of the movable component. Accordingly, the sensed parameter may be determined without direct contact by a measurement device such as speed sensors, brushes, and the like, for example.

Figure 3:
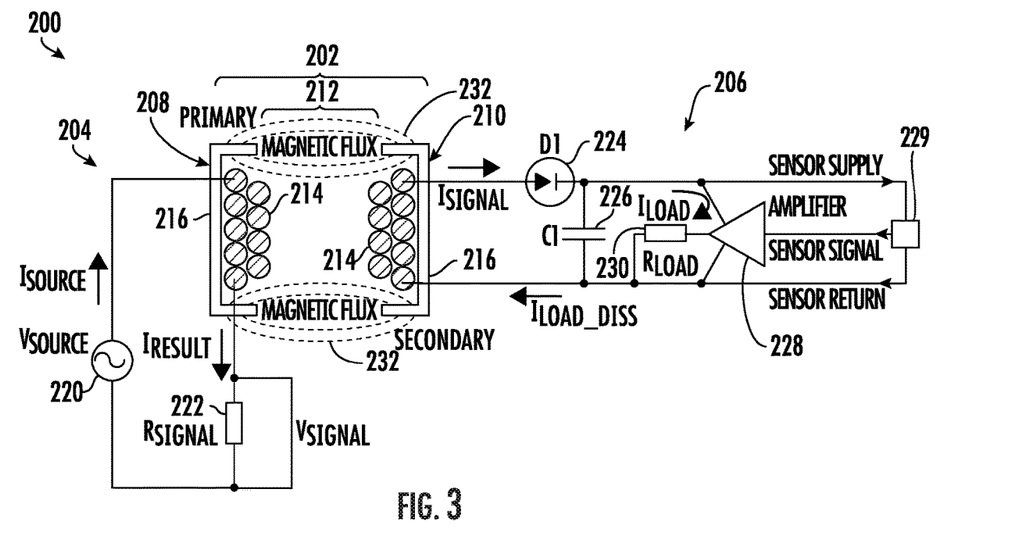
FIG. 3 is a schematic diagram of a network including a sensor assembly in electrical communication with a primary electrical circuit and a secondary electrical circuit according to another embodiment of the presently disclosed subject matter.

FIG. 3 illustrates a network 200 accordingly to another embodiment of the presently disclosed subject matter. The network 200 includes a sensor assembly 202 in electrical communication with a primary or first electrical circuit 204 and a secondary or second electrical circuit 206. As illustrated, the sensor assembly 202 includes a stationary or first wire coil 208 and a spaced apart movable second wire coil 210 forming an interstice 212 (i.e. an air gap) therebetween. In certain embodiments, the stationary wire coil 208 is coupled to a stationary component (not depicted) of a machine (not depicted) and the movable wire coil 210 is coupled to a movable component (not depicted) of the machine. The movable wire coil 210 shown is configured to rotate about a rotational axis which passes through a center point thereof (similar to the rotational axis X of the movable wire coil 110 shown in FIG. 2). It is understood, however, that the movable wire coil 210 may be configured to move about or along any suitable axis as desired.

Each of the wire coils 208, 210 shown may be formed by an electrical wire 214 wrapped about a mounting structure 216. The mounting structure 216 may be a C-shaped housing configured to receive the electrical wire 214 therein, as shown in FIG. 3. It should be appreciated that any suitable method may be used to form the wire coils 208, 210. Although both of the wire coils 208, 210 shown have the same general size, shape, and configuration, it is understood that each the wire coils 208, 210 may have any suitable size, shape, and configuration as desired. For example, an inner diameter of one of the wire coils 208, 210 may be larger than an outer diameter of a remaining one of the wire coils 208, 210 to allow the one of the wire coils 208, 210 to be concentrically disposed about the remaining one of the wire coils 208, 210.

As illustrated, the stationary wire coil 208 is employed in the primary electrical circuit 204. The primary electrical circuit 204 may further include a power source 220 or $V_{source}$ (e.g. an oscillator) and a signal device 222 configured to generate an output signal. In certain embodiments, the signal device 222 may be a resistor or $R_{signal}$ with an associated $V_{signal}$ indicative of a sensed parameter of the movable component. In other embodiments, however, the signal device 222 may be other types of electrical current sensing devices (e.g. a hall-effect sensor) and methods that are configured to convert an electrical current (e.g. $I_{result}$) into a measurable output signal indicative of the sensed parameter of the movable component. The signal device 222 may also be in electrical communication with a controller (not depicted) configured to receive and process the output signal.

The power source 220 is configured to supply an electrical current $I_{source}$ to the primary electrical circuit 204. The movable wire coil 210 is employed in the secondary electrical circuit 206 to facilitate a transmission of an electrical current $I_{signal}$ from the primary electrical circuit 204. In certain embodiments, the electrical current $I_{signal}$ is a portion of the electrical current $I_{source}$ supplied by the power source 220. Each of the electrical currents $I_{source}$ and $I_{signal}$ is an alternating current (AC). It should be appreciated, however, that the electrical currents $I_{source}$ and $I_{signal}$ may be any suitable electrical current, if desired.

As illustrated in FIG. 3, the secondary electrical circuit 206 may further include a diode 224, a capacitor 226 for storing electrical energy therein, an amplifier 228, a sensing device 229, and a resistor 230 or $R_{load}$. As shown, the capacitor 226 is connected in parallel to at least one of the amplifier 228, the sensing device 229, and the resistor 230. At least one module (not depicted) may be utilized to house at least one of the diode 224, the capacitor 226, the amplifier 228, the sensing device 229, the resistor 230, and any other components of the secondary electrical circuit 206. In certain embodiments, where the electrical current $I_{signal}$ are alternating currents, the diode 224 converts the electrical current $I_{signal}$ to a direct electrical current (DC) $I_{load}$. In the embodiment shown, at least one of the electrical current $I_{load}$ and the electrical energy stored in the capacitor 226 are used to provide power to the amplifier 228 and the sensing device 229. As a non-limiting example, the electrical current (e.g. a sensor supply) flows to and through the sensing device 229, and thereafter the electrical current (e.g. a sensor return) returns.

In the embodiment shown, the sensing device 229 is configured to sense and/or measure a parameter of the movable component and generate a corresponding sensor signal. It should be appreciated that the sensing device 229 of the secondary electrical circuit 206 can be any suitable type of sensor which is configured to sense and/or measure the parameter of the movable component such as a sensor that changes an electrical current as a function of a operational parameter, for example. Various types of the sensing device 229 include but are not limited to a strain gauge, a temperature sensor, a position sensor, and the like.

The amplifier 228 is configured to receive the sensor signal from the sensing device 229. In certain embodiments, the amplifier 228 is configured to receive and increase a power magnitude of the sensor signal prior to flowing through the resistor 230. Accordingly, the electrical current $I_{load}$ is varied as a function of the sensor signal.

During operation of the network 200, the power source 220 supplies the electrical current $I_{source}$ to the primary electrical circuit 204. As illustrated, the electrical current $I_{source}$ flows from the power source 220 through the stationary wire coil 208. A magnet flux field 232 may be produced as the electrical current $I_{source}$ flows through the stationary wire coil 208. In certain embodiments, the magnet flux field 232 facilitates a transmission of a portion of the electrical current $I_{source}$ from the primary electrical circuit 204 across the interstice 212 to the movable wire coil 210 of the secondary electrical circuit 206, resulting in the electrical current $I_{signal}$. More specifically, the stationary wire coil 208 may convert the electrical current $I_{source}$ from an electrical signal to a magnetic signal by modulating the magnetic flux field 232, and the movable wire coil 210 converts the magnetic signal received from the stationary wire coil 208 to the electrical current $I_{signal}$. A remaining portion of the electrical current $I_{source}$ continues to flow through the stationary wire coil 208 of the primary electrical circuit 204.

Simultaneously, the electrical current $I_{signal}$ flows from the movable wire coil 210 through the diode 224. As the electrical current $I_{signal}$ flows through the diode 224, the electrical current $I_{signal}$ is converted to the direct electrical current $I_{load}$. Thereafter, a portion of the electrical current $I_{load}$ flows to the capacitor 226 for storing electrical energy therein, and another portion of the electrical current $I_{load}$ flows to the amplifier 228 and the sensing device 229.

The sensing device 229 senses and/or measures the parameter of the movable component of the machine, and generates the corresponding sensor signal. The sensor signal is transmitted to the amplifier 228, in which the sensor signal is amplified. The amplified sensor signal causes a variation of the electrical current $I_{load}$ flowing through the resistor 230. In the embodiment shown, an amount of energy of the electrical current $I_{load}$ that flows through the resistor 230 is dissipated as a function of the sensor signal, generating an electrical current $I_{load\_diss}$. The electrical current $I_{load\_diss}$ then flows from the resistor 230 and returns to the movable wire coil 210.

In certain embodiments, the magnet flux field 232 also facilitates a transmission of the $I_{load\_diss}$ from the movable wire coil 210, across the interstice 212, to the stationary wire coil 208 of the primary electrical circuit 204. More specifically, the movable wire coil 210 may convert the electrical current $I_{load\_diss}$ from an electrical signal to a magnetic signal by modulating the magnetic flux field 232, and the stationary wire coil 208 converts the magnetic signal received from the movable wire coil 210 to the electrical current $I_{load\_diss}$. In certain embodiments, the remaining portion of the electrical current $I_{source}$ flowing from the power source 220 through the stationary wire coil 208 may be summed with the electrical current $I_{load\_diss}$ flowing from the secondary electrical circuit 206, resulting in an electrical current $I_{result}$.

Thereafter, the electrical current $I_{result}$ flows from the stationary wire coil 208 through the signal device 222 to return to the power source 220. The signal device 222 generates an output signal indicative of the sensed parameter of the movable component. In certain embodiments, the electrical current $I_{result}$ may have a dissipated amount of energy which is reflected in an amount of voltage $V_{signal}$ that is developed across the signal device 222. Such variation in the amount of energy of the electrical current $I_{source}$ to the amount of energy of the electrical current $I_{result}$ is indicative of the sensed parameter of the movable component of the machine. The output signal (e.g. $V_{signal}$) is then received and processed by the controller, and can be used to enhance operation and performance of the machine.

In one non-limiting example, the sensing device 229 may be coupled to the movable component. Hence, the output signal generated by the signal device 222, which is representative of the variation in the amount of energy of the electrical current $I_{source}$ to the amount of energy of the electrical current $I_{result}$, is indicative of the sensed parameter (e.g. a position, a temperature, a rotational speed, a torque, and the like) of the movable component. Accordingly, the sensed parameter may be determined without direct contact by a measurement device such as brushes, for example.

Figure 4:
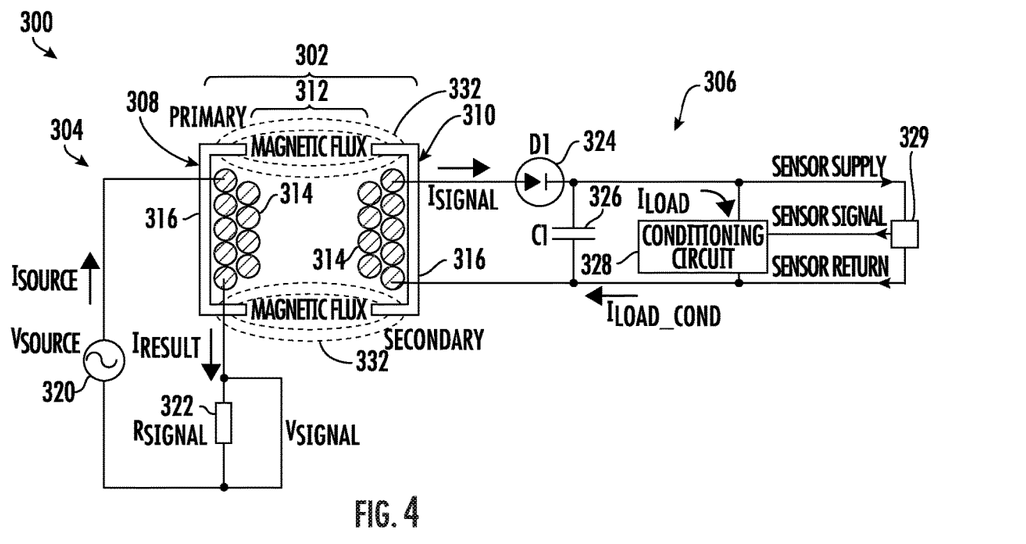
FIG. 4 is a schematic diagram of a network including a sensor assembly in electrical communication with a primary electrical circuit and a secondary electrical circuit according to yet another embodiment of the presently disclosed subject matter.

FIG. 4 illustrates a network 300 accordingly to another embodiment of the presently disclosed subject matter. The network 300 includes a sensor assembly 302 in electrical communication with a primary or first electrical circuit 304 and a secondary or second electrical circuit 306. As illustrated, the sensor assembly 302 includes a stationary or first wire coil 308 and a spaced apart movable second wire coil 310 forming an interstice 312 (i.e. an air gap) therebetween. In certain embodiments, the stationary wire coil 308 is coupled to a stationary component (not depicted) of a machine (not depicted) and the movable wire coil 310 is coupled to a movable component (not depicted) of the machine. The movable wire coil 310 shown in FIG. 4 is configured to rotate about a rotational axis which passes through a center point thereof (similar to the rotational axis X of the movable wire coil 110 shown in FIG. 2). It is understood, however, that the movable wire coil 310 may be configured to move about or along any suitable axis as desired.

Each of the wire coils 308, 310 shown may be formed by an electrical wire 314 wrapped about a mounting structure 316. The mounting structure 316 may be a C-shaped housing configured to receive the electrical wire 314 therein, as shown in FIG. 4. It should be appreciated that any suitable method may be used to form the wire coils 308, 310. Although both of the wire coils 308, 310 shown have the same general size, shape, and configuration, it is understood that each the wire coils 308, 310 may have any suitable size, shape, and configuration as desired. For example, an inner diameter of one of the wire coils 308, 310 may be larger than an outer diameter of a remaining one of the wire coils 308, 310 to allow the one of the wire coils 308, 310 to be concentrically disposed about the remaining one of the wire coils 308, 310.

As illustrated, the stationary wire coil 308 is employed in the primary electrical circuit 304. The primary electrical circuit 304 may further include a power source 320 or $V_{source}$ (e.g. an oscillator) and a signal device 322 configured to generate an output signal. In certain embodiments, the signal device 322 may be a resistor or $R_{signal}$ with an associated $V_{signal}$ indicative of a sensed parameter of the movable component. In other embodiments, however, the signal device 322 may be other types of electrical current sensing devices (e.g. a hall-effect sensor) and methods that are configured to convert an electrical current (e.g. $I_{result}$) into a measurable output signal indicative of the sensed parameter of the movable component. The signal device 322 may also be in electrical communication with a controller (not depicted) configured to receive and process the output signal.

The power source 320 is configured to supply an electrical current $I_{source}$ to the primary electrical circuit 304. The movable wire coil 310 is employed in the secondary electrical circuit 306 to facilitate a transmission of an electrical current $I_{signal}$ from the primary electrical circuit 304. In certain embodiments, the electrical current $I_{signal}$ is a portion of the electrical current $I_{source}$ supplied by the power source 320. Each of the electrical currents $I_{source}$ and $I_{signal}$ is an alternating current (AC). It should be appreciated, however, that the electrical currents $I_{source}$ and $I_{signal}$ may be any suitable electrical current, if desired.

As illustrated in FIG. 4, the secondary electrical circuit 306 may further include a diode 324, a capacitor 326 for storing electrical energy therein, a conditioning circuit 328, and a sensing device 329. As shown, the capacitor 326 is connected in parallel to at least one of the conditioning circuit 328 and the sensing device 329. In certain embodiments, where the electrical current $I_{signal}$ are alternating currents, the diode 324 converts the electrical current $I_{signal}$ to a direct electrical current (DC) $I_{load}$. In the embodiment shown, the electrical current $I_{load}$ and the electrical energy stored in the capacitor 326 are used to provide power to the conditioning circuit 328 and the sensing device 329. As a non-limiting example, the electrical current (e.g. a sensor supply) flows to and through the sensing device 329, and thereafter the electrical current (e.g. a sensor return) returns.

In the embodiment shown, the sensing device 329 is configured to sense and/or measure a parameter of the movable component and generate a corresponding sensor signal. It should be appreciated that the sensing device 329 of the secondary electrical circuit 306 can be any suitable type of sensor which is configured to sense and/or measure the parameter of the movable component such as a sensor that changes an electrical current as a function of an operational parameter, for example. Various types of the sensing device 329 include but are not limited to a strain gauge, a temperature sensor, a position sensor, and the like.

The conditioning circuit 328 may include a controller or microcontroller (not depicted), a resistor (not depicted), and a variety of electronic circuits (not depicted). The network 300 permits implementation of a wide range of sensing and controlling functions with data and power transmitted over the interstice 312 by both analog and digital data. One example of a method as to which data may be digitally transmitted is Peripheral Sensor Interface 5 (PSI5) having communications transmitted sensor poser supply lines.

In certain embodiments, the conditioning circuit 328 is configured to receive the sensor signal from the sensing device 329. In certain embodiments, the conditioning circuit 228 is configured to receive the sensor signal prior to the electrical current $I_{load}$ flowing through the resistor in the conditioning circuit 328. Accordingly, the electrical current $I_{load}$ is varied as a function of the sensor signal.

During operation of the network 300, the power source 320 supplies the electrical current $I_{source}$ to the primary electrical circuit 304. As illustrated, the electrical current $I_{source}$ flows from the power source 320 through the stationary wire coil 308. A magnet flux field 332 may be produced as the electrical current $I_{source}$ flows through the stationary wire coil 308. In certain embodiments, the magnet flux field 326 facilitates a transmission of a portion of the electrical current $I_{source}$ from the primary electrical circuit 304 across the interstice 312 to the movable wire coil 310 of the secondary electrical circuit 306, resulting in the electrical current $I_{signal}$. More specifically, the stationary wire coil 308 may convert the electrical current $I_{source}$ from an electrical signal to a magnetic signal by modulating the magnetic flux field 332, and the movable wire coil 310 converts the magnetic signal received from the stationary wire coil 308 to the electrical current $I_{signal}$. A remaining portion of the electrical current $I_{source}$ continues to flow through the stationary wire coil 308 of the primary electrical circuit 304.

Simultaneously, the electrical current $I_{signal}$ flows from the movable wire coil 310 through the diode 324. As the electrical current $I_{signal}$ flows through the diode 324, the electrical current $I_{signal}$ is converted to the direct electrical current $I_{load}$. Thereafter, a portion of the electrical current $I_{load}$ flows to the capacitor 326 for storing electrical energy therein, and another portion of the electrical current $I_{load}$ flows to the conditioning circuit 328.

The sensing device 329 senses and/or measures the parameter of the movable component of the machine, and generates the corresponding sensor signal. The sensor signal is transmitted to the conditioning circuit 328. The sensor signal causes a variation of the electrical current $I_{load}$ flowing through the resistor. In the embodiment shown, an amount of energy of the electrical current $I_{load}$ is varied as a function of the sensor signal, generating an electrical current $I_{load\_cond}$. The electrical current $I_{load\_cond}$ then flows from the conditioning circuit 328 and returns to the movable wire coil 310.

In certain embodiments, the magnet flux field 332 also facilitates a transmission of the $I_{load\_cond}$ from the movable wire coil 310, across the interstice 312, to the stationary wire coil 308 of the primary electrical circuit 304. More specifically, the movable wire coil 310 may convert the electrical current $I_{load\_cond}$ from an electrical signal to a magnetic signal by modulating the magnetic flux field 332, and the stationary wire coil 308 converts the magnetic signal received from the movable wire coil 310 to the electrical current $I_{load\_cond}$. In certain embodiments, the remaining portion of the electrical current $I_{source}$ flowing from the power source 320 through the stationary wire coil 308 may be summed with the electrical current $I_{load\_cond}$ flowing from the secondary electrical circuit 306, resulting in an electrical current $I_{result}$.

Thereafter, the electrical current $I_{result}$ flows from the stationary wire coil 308 through the signal device 322 to return to the power source 320. The signal device 322 generates an output signal indicative of the sensed parameter of the movable component. In certain embodiments, the electrical current $I_{result}$ may have a dissipated amount of energy which is reflected in an amount of voltage $V_{signal}$ that is developed across the signal device 322. Such variation in the amount of energy of the electrical current $I_{source}$ to the amount of energy of the electrical current $I_{result}$ is indicative of the sensed parameter of the movable component of the machine. The output signal (e.g. $V_{signal}$) is then received and processed by the controller in electrical communication with the primary electrical circuit 304, and can be used to enhance operation and performance of the machine.

In one non-limiting example, the sensing device 329 may be coupled to the movable component. Hence, the output signal generated by the signal device 322, which is representative of the variation in the amount of energy of the electrical current $I_{source}$ to the amount of energy of the electrical current $I_{result}$, is indicative of the sensed parameter (e.g. a position, a temperature, a rotational speed, a torque, and the like) of the movable component. Accordingly, the sensed parameter may be determined without direct contact by a measurement device such as brushes, for example.

Figure 5:
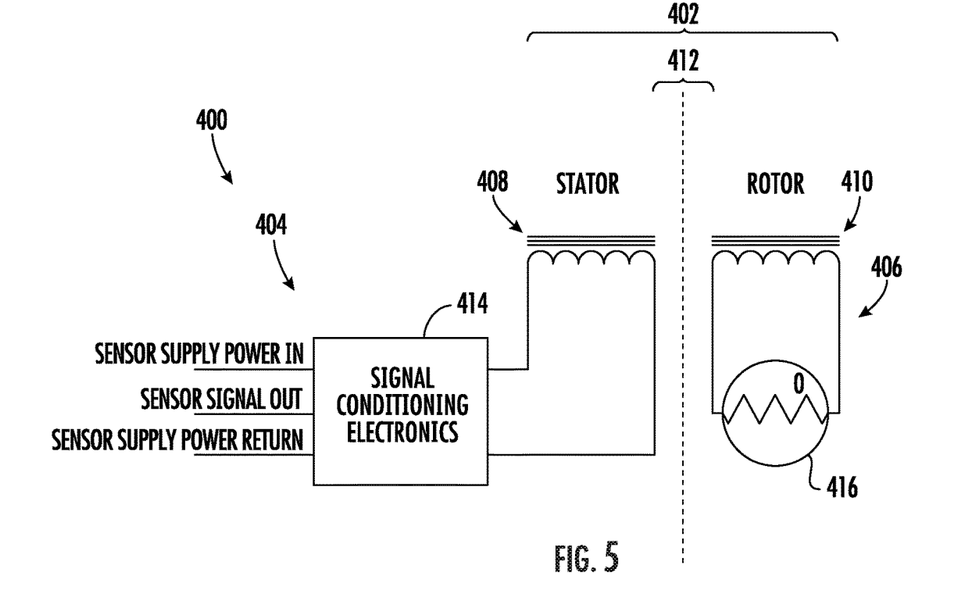
FIG. 5 is a schematic diagram of a network according to an embodiment of the presently disclose subject matter implemented in an electric motor.

FIG. 5 illustrates a network 400 accordingly to another embodiment of the presently disclosed subject matter. The network 400 includes a sensor assembly 402 in electrical communication with a primary or first electrical circuit 404 and a secondary or second electrical circuit 406. As illustrated, the sensor assembly 402 includes a stationary or first wire coil 408 and a spaced apart movable second wire coil 410 forming an interstice 412 (i.e. an air gap) therebetween. In certain embodiments, the stationary wire coil 408 is coupled to a stationary component of a machine (not depicted) such as a stator of an electric motor, for example, and the movable wire coil 410 is coupled to a movable component of the machine such as a rotor of the electric motor, for example.

Each of the wire coils 408, 410 shown may be formed by an electrical wire (not depicted) wrapped about a mounting structure (not depicted). It should be appreciated that any suitable method may be used to form the wire coils 408, 410. Although both of the wire coils 408, 410 shown have the same general size, shape, and configuration, it is understood that each the wire coils 408, 410 may have any suitable size, shape, and configuration as desired.

As illustrated, the stationary wire coil 408 is employed in the primary electrical circuit 404. The primary electrical circuit 404 may further include a power source (not depicted) (e.g. an oscillator) configured to supply an electrical current to the primary electrical circuit 404 and a signal conditioning circuit 414 configured to generate an output signal. The signal conditioning circuit 414 may include a signal device (not depicted), a controller or microcontroller (not depicted), and a variety of electronic circuits. The network 400 permits implementation of a wide range of sensing and controlling functions with data and power transmitted over the interstice 412 by both analog and digital data. One example of a method as to which data may be digitally transmitted is Peripheral Sensor Interface 5 (PSI5) having communications transmitted sensor poser supply lines. In the embodiment shown, the electrical current is used to provide power to the conditioning circuit 414. As a non-limiting example, the electrical current (e.g. a sensor supply power in) flows to and through the signal device, and thereafter the electrical current (e.g. a sensor supply power return) returns.

In certain embodiments, the signal device may be a resistor with an associated voltage indicative of a sensed parameter of the movable component. In other embodiments, however, the signal device may be other types of electrical current sensing devices (e.g. a hall-effect sensor) and methods that are configured to convert an electrical current from the secondary electrical circuit 410 into a measurable output signal indicative of the sensed parameter of the movable component. The signal device may also be in electrical communication with a controller (not depicted) configured to receive and process the output signal. The movable wire coil 410 is employed in the secondary electrical circuit 406 to facilitate a transmission of an electrical current from the primary electrical circuit 404. Each of the electrical currents of the primary and secondary electrical circuits 404, 406 is an alternating current (AC). It should be appreciated, however, that the electrical currents may be any suitable electrical current, if desired. As illustrated in FIG. 5, the secondary electrical circuit 406 may further include a sensing device 416 such as a resistor or thermistor. The sensing device 416 is configured to sense and/or measure a parameter (e.g. a temperature) of the movable component and generate a corresponding sensor signal. It should be appreciated that the sensing device 416 of the secondary electrical circuit 406 can be any suitable type of sensor which is configured to sense and/or measure the parameter of the movable component such as a sensor that changes an electrical current as a function of an operational parameter, for example. Various types of the sensing device 416 include but are not limited to a strain gauge, a temperature sensor, a position sensor, and the like.

During operation of the network 400, the power source supplies the electrical current to the primary electrical circuit 404. As illustrated, the electrical current flows from the power source through the stationary wire coil 408. A magnet flux field may be produced as the electrical current flows through the stationary wire coil 408. In certain embodiments, the magnet flux field facilitates a flow of a portion of the electrical current from the primary electrical circuit 404 across the interstice 412 to the movable wire coil 410 of the secondary electrical circuit 406, resulting in the electrical current. More specifically, the stationary wire coil 408 may convert the electrical current of the primary electrical circuit 404 from an electrical signal to a magnetic signal by modulating the magnetic flux field, and the movable wire coil 410 converts the magnetic signal received from the stationary wire coil 408 to the electrical current of the secondary electrical circuit 406. A remaining portion of the electrical current of the primary electrical circuit 404 continues to flow through the stationary wire coil 408 of the primary electrical circuit 404.

Simultaneously, the electrical current of the secondary electrical circuit 406 flows from the movable wire coil 410 through the sensing device 416 and returns to the movable wire coil 410. As the electrical current of the secondary electrical circuit 406i flows through the sensing device 416, the sensing device 416 senses and/or measures the parameter of the movable component and generates the corresponding sensor signal. In the embodiment shown, the sensor signal is an amount of energy of the electrical current of the secondary electrical circuit 406 that flows through the sensing device 416 which is dissipated, generating a dissipated electrical current. The dissipated electrical current then flows from the sensing device 416 and returns to the movable wire coil 410. In certain embodiments, the magnet flux field also facilitates a flow of the dissipated electrical current from the sensing device 416 to the movable wire coil 410, across the interstice 412, to the stationary wire coil 408 of the primary electrical circuit 404. More specifically, the movable wire coil 410 may convert the dissipated electrical current of the secondary electrical circuit 406 from an electrical signal to a magnetic signal by modulating the magnetic flux field, and the stationary wire coil 408 converts the magnetic signal received from the movable wire coil 410 to the dissipated electrical current of the primary electrical circuit 404. In certain embodiments, the remaining portion of the electrical current of the primary electrical circuit 404 flowing from the power source through the stationary wire coil 408 may be summed with the dissipated electrical current flowing from the secondary electrical circuit 406, producing a resultant electrical current.

Thereafter, the resultant electrical current flows from the stationary wire coil 408 through the signal conditioning circuit 414 to return to the power source. In certain embodiments, the resultant electrical current may have a dissipated amount of energy which is reflected in an amount of voltage that is developed in the sensor conditioning circuit 414. Such variation in the amount of energy of the electrical current from the power source to the amount of energy of the resultant electrical current is indicative of a variation caused by the sensing device 416. The signal device of the signal conditioning circuit 414 generates an output signal indicative of the sensed parameter of the movable component. The output signal is then received and processed by the controller, and can be used to enhance operation and performance of the machine.

Figure 6:
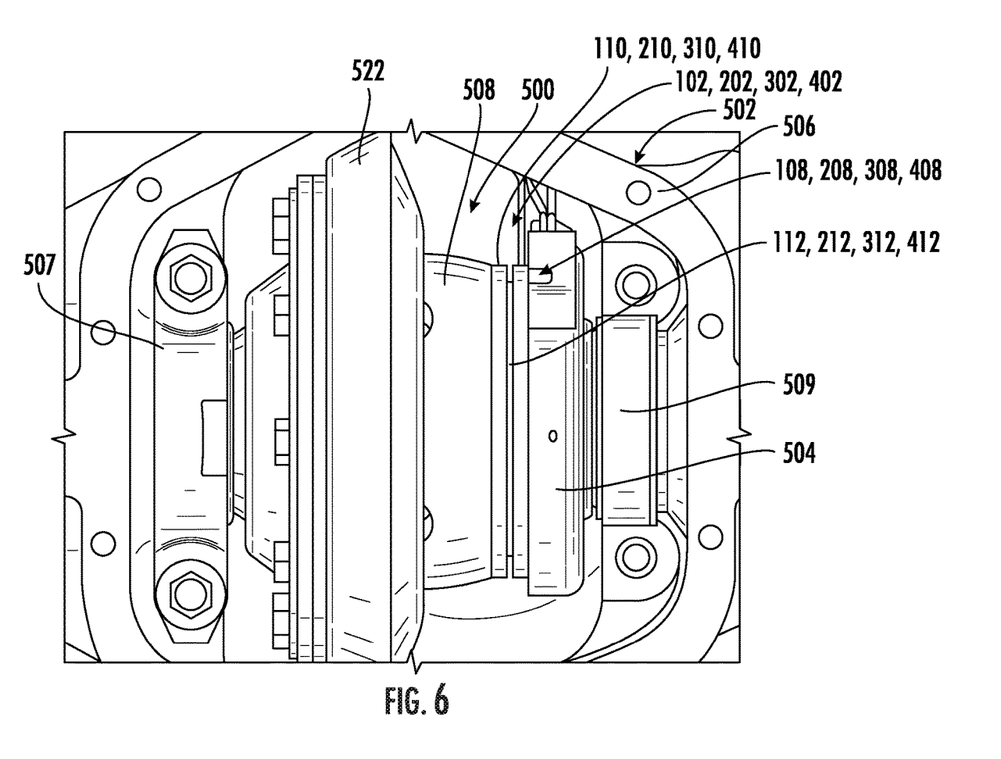
FIG. 6 is a fragmentary elevational view of an axle assembly for a vehicle including a differential assembly having one of the networks illustrated in FIGS. 1, 3-4 implemented therewith according to an embodiment of the presently disclosed subject matter.
Figure 7:
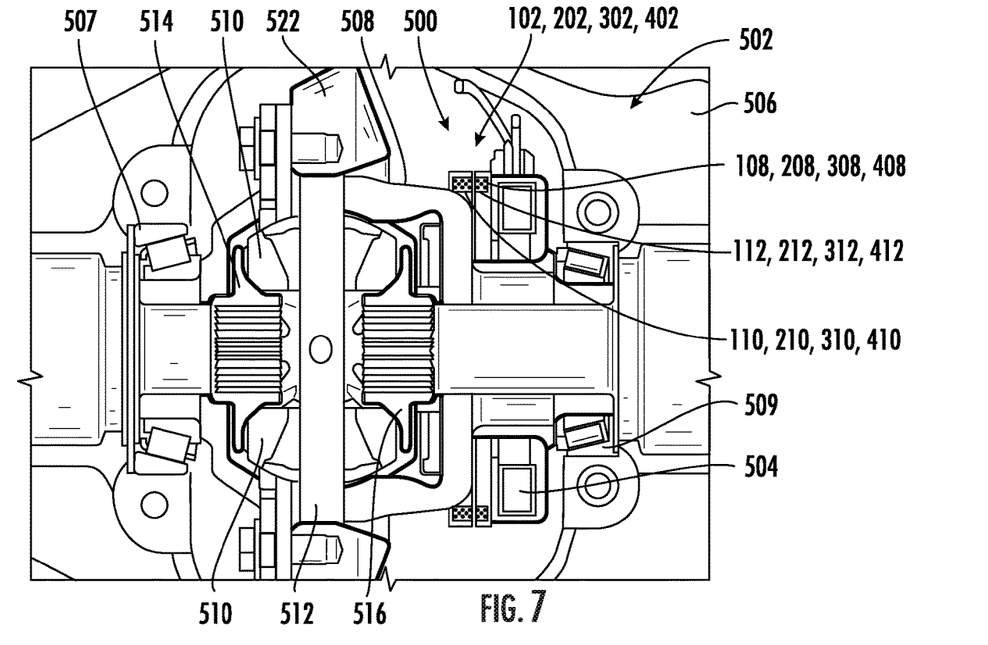
FIG. 7 is a fragmentary elevational view, partially in section, of the axle assembly of FIG. 6.
Figure 8:
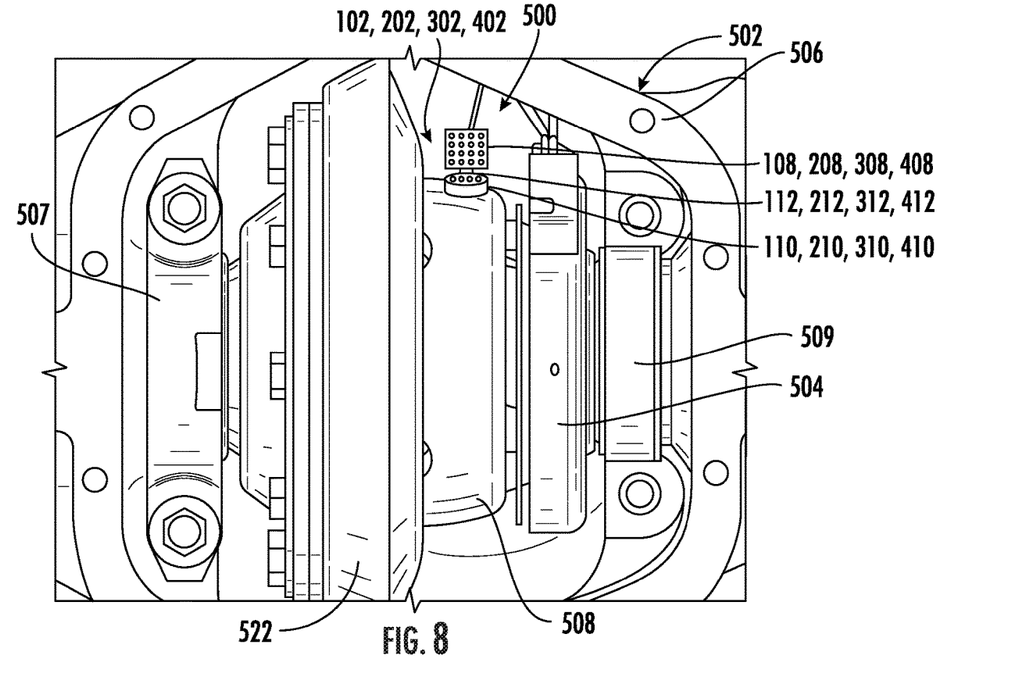
FIG. 8 is a fragmentary elevational view, partially in section, of an axle assembly for a vehicle including a differential assembly having one of the networks illustrated in FIGS. 1, 3-4 implemented therewith according to another embodiment of the presently disclosed subject matter.

Referring now to FIGS. 6-8, at least one of the networks 100, 200, 300, 400 may be employed with a differential assembly 500 disposed in an axle assembly 502 of a vehicle (not depicted). The differential assembly 502 may be engaged and disengaged by an actuating mechanism 504 such as an electromagnetic coil, for example. The differential assembly 500 may be rotatably supported within an axle housing 506 via a pair of bearings 507, 509. It is understood that each of the bearings 507, 509 can be any type of bearing as desired such as a roller bearing, a ball bearing, a tapered bearing, and the like, for example. The differential assembly 500, more clearly shown in FIG. 7, includes two or more differential pinions 510 disposed within a differential case 508. The differential pinions 510 are coupled with the differential case 508 via a pinion shaft 512. In an embodiment, the pinion shaft 512 may comprise a cross member. The differential pinions 510 are in meshed engagement with first and second side gears 514, 516. The first and second side gears 514, 516 are coupled for rotation with the first and second axle half shafts (not depicted). A ring gear 522 may be coupled to the differential case 508 for causing a rotational movement of the differential case 508.

In certain embodiments shown in FIGS. 6-7, one of the stationary wire coils 108, 208, 308, 408 is coupled to a stationary component (e.g. the electromagnetic coil 504 of the differential assembly 500 or the housing 506 of the axle assembly 502), and one of the movable wire coils 110, 210, 310, 410 is axially spaced apart from the one of the stationary wire coils 108, 208, 308, 408, and coupled to a movable component (e.g. the differential case 508 of the differential assembly 500), forming one of the interstices 112, 212, 312, 412 therebetween.

In other certain embodiments shown in FIG. 8, one of the stationary wire coils 108, 208, 308, 408 is coupled to a stationary component (e.g. the housing 506 of the axle assembly 502), and one of the movable wire coils 110, 210, 310, 410 is radially inwardly spaced apart from the one of the stationary wire coils 108, 208, 308, 408, and coupled to a movable component (e.g. the differential case 508 of the differential assembly 500), forming one of the interstices 112, 212, 312, 412 therebetween.

Figure 9:
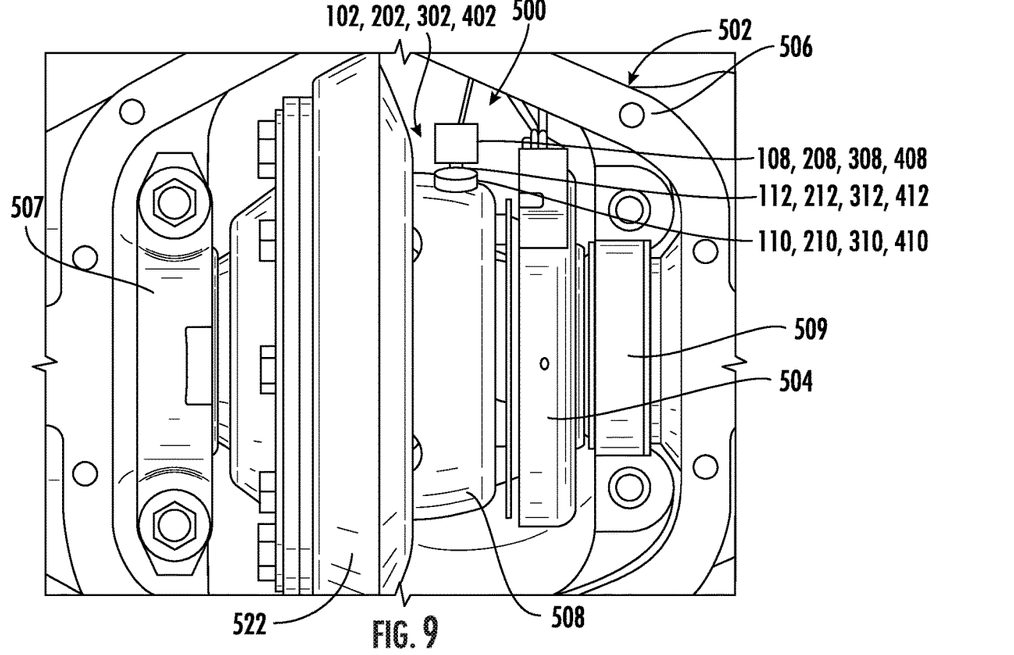
FIG. 9 is a fragmentary elevational view, partially in section, of an axle assembly for a vehicle including a differential assembly having one of the networks illustrated in FIGS. 1, 3-4 implemented therewith according to yet another embodiment of the presently disclosed subject matter.
Figure 10:
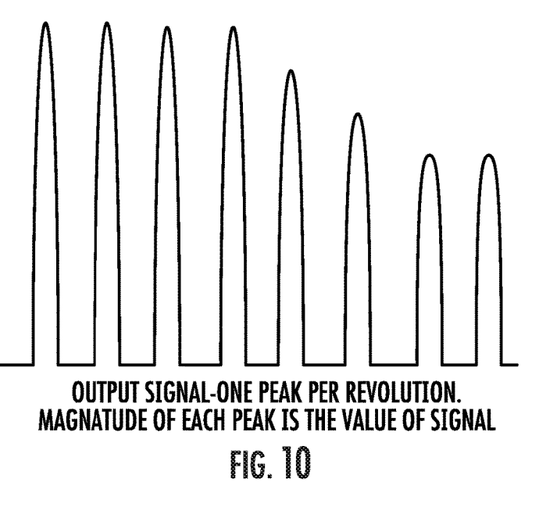
FIG. 10 is a schematic diagram of an output signal of the implementation shown in FIG. 9.

In yet other certain embodiments shown in FIG. 9, one of the stationary wire coils 108, 208, 308, 408 is coupled to a stationary component (e.g. the housing 506 of the axle assembly 502), and one of the movable wire coils 110, 210, 310, 410 is radially inwardly spaced apart from the one of the stationary wire coils 108, 208, 308, 408, and coupled to a movable component (e.g. the differential case 508 of the differential assembly 500), forming one of the interstices 112, 212, 312, 412 therebetween. However, the one of the stationary wire coils 108, 208, 308, 408 coupled to the stationary component and/or one of the movable wire coils 110, 210, 310, 410 coupled to the movable component is not a continuous ring-shaped coil but a single separate coil element coupled thereto. As such, a single output signal is generated per one revolution, not continuously as in the embodiments described hereinabove. Moreover, a magnitude of a pulse generated is a value of the output signal as illustrated in FIG. 10.

In yet other embodiments not shown, when the one of the stationary wire coils 108, 208, 308, 408 coupled to a stationary component and/or one of the movable wire coils 110, 210, 310, 410 coupled to a movable component is not a continuous ring-shaped coil but an array of separate coil elements coupled thereto in a ring-shaped configuration, a plurality of output signals is generated per one revolution, but not continuously as in the embodiments described hereinabove.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising: a housing of the axle assembly, wherein a differential assembly is supported within the housing of the axle assembly; a movable component at least partially disposed in the housing, wherein the movable component is a differential case; and a sensor assembly configured to sense a parameter of the differential case of the axle assembly, the sensor assembly including: a stationary first wire coil disposed within the housing and coupled to an electromagnetic coil of the differential assembly, the stationary first wire coil in electrical communication with a first electrical circuit; and a second wire coil disposed within the housing and coupled to the differential case for rotation therewith, the second wire coil in electrical communication with a second electrical circuit including a sensing device for measuring the parameter of the differential case of the axle assembly, wherein the second wire coil is disposed adjacent the stationary first wire coil generating a magnetic field therebetween, and wherein the magnetic field facilitates transmission of an electrical current varied as a function of the parameter of the differential case of the axle assembly from the second electrical circuit to the first electrical circuit.

2. The axle assembly of claim 1, wherein a ring gear is coupled to the differential case.

3. The axle assembly of claim 1, wherein two or more differential pinions are disposed within and coupled to the differential case via a pinion shaft.

4. The axle assembly of claim 1, wherein the second wire coil is axially spaced apart from the stationary first wire coil.

5. The axle assembly of claim 1, wherein at least one of the stationary first wire coil and the second wire coil is one of a continuous ring-shaped coil, a single coil element, and an array of coil elements disposed in a ring-shaped configuration.

6. The axle assembly of claim 1, wherein the first electrical circuit includes a signal device for generating an output signal indicative of the parameter of the differential case.

7. The axle assembly of claim 1, wherein the first electrical circuit includes a signal conditioning circuit for generating an output signal indicative of the parameter of the differential case.

8. The axle assembly of claim 1, wherein the second electrical circuit further includes a capacitor connected in parallel with the sensing device.

9. The axle assembly of claim 1, wherein the second electrical circuit further includes an amplifier for increasing a magnitude of a sensor signal generated by the sensing device.

10. The axle assembly of claim 9, wherein the amplifier is in electrical communication with a resistor configured to receive the electrical current varied as the function of the parameter of the differential case.

11. The axle assembly of claim 1, wherein the second electrical circuit further includes a conditioning circuit for receiving and conditioning a sensor signal generated by the sensing device.

12. The axle assembly of claim 11, wherein the conditioning circuit includes a resistor configured to receive the electrical current varied as the function of the parameter of the differential case.

13. A method of sensing, comprising the steps of:
providing an axle assembly including a sensor assembly configured to sense a parameter of a movable component of the axle assembly, wherein the movable component is a differential case, wherein the axle assembly includes a differential assembly, and wherein the differential assembly is supported within a housing of the axle assembly, wherein the sensor assembly includes a first wire coil disposed within the housing and a second wire coil that is spaced apart from the first wire coil and disposed within the housing, wherein the first wire coil is in electrical communication with a first electrical circuit including a signal device coupled to the housing, and wherein the second wire coil is in electrical communication with a second electrical circuit including a sensing device for measuring the parameter of the differential case;
generating a magnetic field between the first wire coil and the second wire coil;
transmitting a further electrical current from the first electrical circuit to the second electrical circuit using the magnetic field;
measuring the parameter of the movable component utilizing the sensing device of the second electrical circuit;
transmitting an electrical current varied as a function of the parameter of the differential case from the second electrical circuit to the first electrical circuit using the magnetic field; and
generating an output signal indicative of the parameter of the differential case using the signal device of the first electrical circuit.

14. The method of claim 13, wherein the sensing device generates a sensor signal used to vary the electrical current transmitted from the first electrical circuit to the second electrical circuit, and wherein the second wire coil is radially inwardly spaced apart from the first wire coil.

15. The method of claim 14, further comprising the step of amplifying a magnitude of the sensor signal generated by the sensing device.

16. The method of claim 14, further comprising the step of conditioning at least one of the electrical current transmitted from the first electrical circuit to the second electrical circuit and the sensor signal generated by the sensing device.

17. The method of claim 13, further comprising the step of conditioning the output signal generated by the signal device.

18. The method of claim 13, further comprising the step of transmitting the output signal generated by the signal device to a controller configured to process the output signal for improving an operation of the axle assembly.

19. A network, comprising:
- a first electrical circuit including a power source and a signal device, wherein the signal device generates an output signal indicative of a parameter of a movable component, wherein the movable component is a differential case;
- a second electrical circuit including a sensing device, wherein the sensing device measures the parameter of the differential case and generates a corresponding sensor signal; and
- a sensor assembly, including:
  - a first wire coil in electrical communication with the first electrical circuit, wherein the first wire coil is disposed within and coupled to a housing of an axle assembly, and wherein the axle assembly includes a differential assembly comprising the differential case, and wherein the differential assembly is supported within the housing of the axle assembly; and
  - a second wire coil in electrical communication with the second electrical circuit, wherein the second wire coil is spaced apart from the first wire coil generating a magnetic field therebetween to facilitate a transmission of an electrical current varied as a function of the parameter of the differential case from the second electrical circuit to the first electrical circuit;
  - wherein the second electrical circuit further includes at least one of an amplifier for increasing a magnitude of the corresponding sensor signal generated by the sensing device and a conditioning circuit for receiving and conditioning the corresponding sensor signal generated by the sensing device, and wherein the corresponding sensor signal is used to vary the electrical current transmitted from the first electrical circuit to the second electrical circuit.

* * * * *